United States Patent
Hilemon et al.

(10) Patent No.: US 9,524,629 B2
(45) Date of Patent: Dec. 20, 2016

(54) ADAPTIVE AND STATE DRIVEN DATA COLLECTION

(71) Applicant: Computational Systems, Inc., Knoxville, TN (US)

(72) Inventors: Christopher G. Hilemon, Knoxville, TN (US); Thomas E. Nelson, Knoxville, TN (US); Robert D. Skeirik, Knoxville, TN (US); Anthony J. Hayzen, Knoxville, TN (US); Deane M. Horn, Knoxville, TN (US)

(73) Assignee: Computational Systems, Inc., Knoxville, TN (US)

( * ) Notice: Subject to any disclaimer, the term of this patent is extended or adjusted under 35 U.S.C. 154(b) by 0 days.

(21) Appl. No.: 14/825,050

(22) Filed: Aug. 12, 2015

(65) Prior Publication Data

US 2016/0048110 A1 Feb. 18, 2016

Related U.S. Application Data (60) Provisional application No. 62/036,746, filed on Aug. 13, 2014, provisional application No. 62/039,553, filed on Aug. 20, 2014.

(51) Int. Cl.
*G05B 21/00* (2006.01)
*G08B 21/02* (2006.01)

(52) U.S. Cl.
CPC .................................. *G08B 21/02* (2013.01)

(58) Field of Classification Search
None
See application file for complete search history.

(56) References Cited

U.S. PATENT DOCUMENTS

| | | |
|---|---|---|
| 5,808,903 A | 9/1998 | Schiltz et al. |
| 6,192,325 B1 | 2/2001 | Piety et al. |
| 6,411,921 B1 | 6/2002 | Schiltz et al. |
| 6,484,109 B1 | 11/2002 | Lofall |
| 6,549,869 B1 | 4/2003 | Piety et al. |

(Continued)

OTHER PUBLICATIONS

"Introduction to AMS Suite: Machinery Health Manager, Course 2068B" Emerson Process Management, 2014.

*Primary Examiner* — Adolf Dsouza
(74) *Attorney, Agent, or Firm* — Luedeka Neely Group, P.C.; Rick Barnes (57) ABSTRACT

Automatically adjusting collection parameters for machines on a route in a collection device, based on states of the machines. For each machine on the route, the machine state is read into the collection device. The machine is included or excluded based on the machine state. The collection device is configured with first collection parameters that are configured based on the machine state. Data is collected from the machine based on the first collection parameters. The data is analyzed using parameters that are configured based on the machine, to determine alerts. Based on the alerts, data is selectively immediately collected from the machine based on second collection parameters that are configured based on the machine state and the alerts. Also based on the alerts, the technician is selectively prompted with the collection device to take a predetermined action and collect data from the machine. The action and data are based on third collection parameters that are configured on the machine state and the alerts.

22 Claims, 5 Drawing Sheets

(56) References Cited

U.S. PATENT DOCUMENTS

| | | |
|---|---|---|
| 6,789,030 B1 | 9/2004 | Coyle et al. |
| 6,801,877 B2 | 10/2004 | Schiltz et al. |
| 7,454,050 B2 | 11/2008 | Garvey |
| 7,847,251 B1 | 12/2010 | Praly |
| 8,707,193 B2 | 4/2014 | Khazanov et al. |
| 8,788,205 B2 * | 7/2014 | Lin .................. G01C 21/206 |
| | | 455/355 |
| 2005/0060123 A1 | 3/2005 | Schiltz et al. |
| 2014/0222378 A1 * | 8/2014 | Piety .................. G05B 23/02 |
| | | 702/183 |
| 2014/0337429 A1 * | 11/2014 | Asenjo ................ G06Q 10/06 |
| | | 709/204 |
| 2015/0172151 A1 | 6/2015 | Bottalico et al. |

\* cited by examiner

ADAPTIVE AND STATE DRIVEN DATA COLLECTION

FIELD

This application is a non-provisional of and claims all rights and priority on prior U.S. provisional patent applications Ser. Nos. 62/036,746 filed Aug. 13, 2014 and 62/039,553 filed Aug. 20, 2014. This invention relates to the field of predictive machinery maintenance (PdM). More particularly, this invention relates to adaptive and state driven data collection for use in predictive machinery maintenance.

INTRODUCTION

Most machinery requires some type of servicing in order to be kept in operational condition. In times past, a machine was serviced once it stopped working properly, such as by breaking down, or when it became readily apparent that it needed servicing, such as by making a noise, generating excessive heat, or not running smoothly. However, waiting until a machine breaks down before it is serviced tends to have many problems, such as collateral damage, inconvenience in the timing of the breakdown, work stoppages, injury to technicians, the excessive costs associated with such, and so forth.

Predictive maintenance reduces many of those problems, at least in part, by monitoring the operation of the machine and providing service at a convenient time as soon as it starts to manifest signs of a problem.

Predictive maintenance typically involves routinely gathering data on a machine, such as at least one of vibration, temperature, sound, and thermal images, and comparing the data to operational guidelines and historical data to determine whether a problem with the machine is indicated. Such techniques are generally well known in the art.

However, it is difficult to know when this data should be acquired, how often it should be acquired, how much data should be acquired, and under what circumstances the data should be acquired, so as to have an adequate understanding of the condition of the machine. One answer to these questions could be—as much data as possible as frequently as possible, so as to not miss anything. However, such a maintenance routine is inefficient and wastes an excessive amount of time and money on monitoring the machine.

SUMMARY OF THE CLAIMS

The above and other needs are met by a method of automatically adjusting data collection parameters for machines on a data collection route in a portable collection device used by a technician, based on states of the machines. For each machine on the data collection route, the state of the machine is read into the portable collection device. The machine is automatically included in or excluded from the data collection route based at least in part on the state of the machine. The portable collection device is automatically configured with a first predetermined set of data collection parameters that is automatically configured based at least in part on the state of the included machine. An initial set of data is collected from the included machine with the portable collection device, based on the first predetermined set of data collection parameters. The initial set of data is automatically analyzed using a predetermined set of data analysis parameters that is automatically configured based at least in part on the state of the included machine, to determine alerts. Based on the alerts, a second set of data is selectively automatically immediately collected from the included machine based on a second predetermined set of data collection parameters that is automatically configured based at least in part on the state of the included machine and the alerts. Also based on the alerts, the technician is selectively prompted with the portable collection device to take a predetermined action and collect a third set of data from the included machine. The action and the third set of data is based on a third predetermined set of data collection parameters that is automatically configured at least in part on the state of the included machine and the alerts.

In some embodiments, the step of reading the state of the machine into the portable collection device includes at least one of directly measuring with the portable collection device machine parameters that are indicative of the state of the machine, the technician manually entering into the portable collection device machine parameters that are indicative of the state of the machine, and automatically downloading from a remote device into the portable collection device machine parameters that are indicative of the state of the machine.

In some embodiments, the state of the machine includes at least one of running, idle, length of run time, length of idle time, run speed, machine age, machine type, and material processed by the machine. In some embodiments, the sets of data collection parameters are disposed in at least one of a memory on the portable data collection device, and a remote computing system and accessed by the portable data collection device over a data network.

In some embodiments, the sets of data include at least one of vibration, temperature, thermal image, sound, oil sample, and technician assessment. In some embodiments, the predetermined action for the technician to take includes at least one of bump testing the included machine, moving sensors, and returning at a later time to take readings, as directed by the portable data collection device.

According to another aspect of the invention there is described a method of automatically adjusting data collection parameters for machines on a data collection route in a portable collection device used by a technician, based on states of the machines. For each machine on the data collection route, the state of the machine is read into the portable collection device, which is automatically configured with a first predetermined set of data collection parameters that is automatically configured based at least in part on the state of the included machine. An initial set of data is collected from the included machine with the portable collection device based on the first predetermined set of data collection parameters. The initial set of data is automatically analyzed using a predetermined set of data analysis parameters that is automatically configured based at least in part on the state of the included machine, to determine alerts. Based on the alerts, the technician is selectively prompted with the portable collection device to take a predetermined action and collect a third set of data from the included machine. The action and the third set of data is based on a third predetermined set of data collection parameters that is automatically configured at least in part on the state of the included machine and the alerts.

According to another aspect of the invention there is described a method of automatically adjusting data collection parameters for machines on a data collection route in a portable collection device used by a technician, based on states of the machines. For each machine on the data collection route, the state of the machine is read into the portable collection device, which is automatically configured with a first predetermined set of data collection parameters that is automatically configured based at least in part on the state of the included machine. An initial set of data is collected from the included machine with the portable collection device based on the first predetermined set of data collection parameters. The initial set of data is automatically analyzed using a predetermined set of data analysis parameters that is automatically configured based at least in part on the state of the included machine.

According to another aspect of the invention there is described a method of automatically adjusting data collection parameters for machines on a data collection route in a portable collection device used by a technician based on states of the machines. For each machine on the data collection route, the state of the machine is read into the portable collection device, which is automatically configured with a first predetermined set of data collection parameters that is automatically configured based at least in part on the state of the included machine. An initial set of data is collected from the included machine with the portable collection device based on the first predetermined set of data collection parameters. The initial set of data is automatically analyzed using a predetermined set of data analysis parameters that is automatically configured based at least in part on the state of the included machine, to determine alerts. Based on the alerts, a second set of data is selectively automatically immediately collected from the included machine based on a second predetermined set of data collection parameters that is automatically configured based at least in part on the state of the included machine and the alerts.

According to another aspect of the invention there is described a method of automatically adjusting data collection parameters for machines on a data collection route in a portable collection device used by a technician, based on states of the machines. For each machine on the data collection route, the state of the machine is read into the portable collection device. The machine is automatically included in or excluded from the data collection route based at least in part on the state of the machine.

In some embodiments according to this aspect of the invention, one of the data collection parameters that is adjusted is a scheduling interval for the machine. In some embodiments, a machine that had previously been excluded from the data collection route is automatically included in the data collection route, during execution of the data collection route, based at least in part on a change of the state of the machine.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Collection Device

Figure 5:
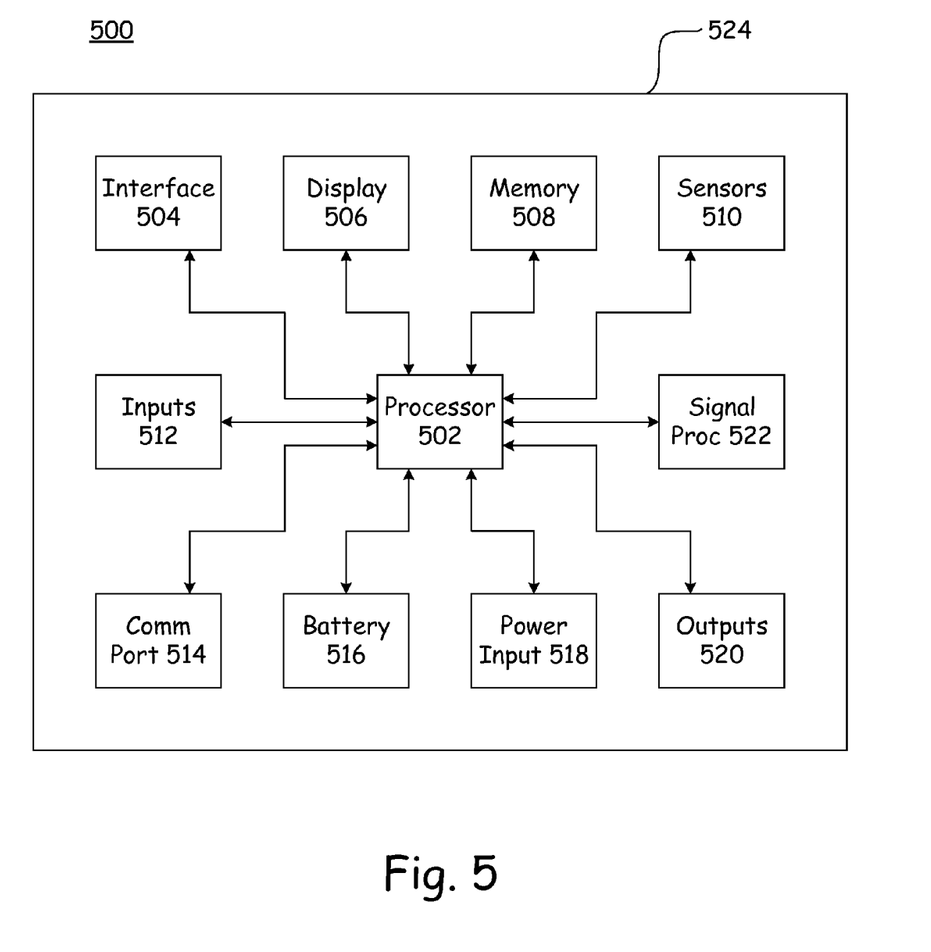
FIG. 5 is a functional block diagram of a portable data collection device according to an embodiment of the present invention.

Described herein are various embodiments of a portable, handheld, programmable, data collection device 500, as depicted in FIG. 5. Described below are brief descriptions of the types of components that are included in the collection device 500. It is appreciated that in various embodiments of the collection device 500, either a subset of the described components are included, or multiple instances of at least some of the components are included. It is also appreciated that the interconnections depicted in FIG. 5 are representative, and that in some embodiments, various ones of the components are connected directly to one another, and do not have all connections routed through the processor 502.

In various embodiments the collection device 500 includes a processor 502, human interface 504, display 506, memory 508, sensors, 510, sensor inputs 512, communication ports 514, battery 516, power input port 518, outputs 520, and signal processors 522, in a ruggedized housing 524.

The processor 502 controls at least a portion of the operation and communication of the collection device 500, and in various embodiments is at least one of a general purpose processor, an ASIC, and a FPGA. The memory 508 in some embodiments is a DRAM, and contains instructions used by the processor 502 to control the operation of the collection device 500, data collected by the collection device 500, and instructions received from outside the collection device 500. Some embodiments include a removable data bank, such as a micro SD card.

In various embodiments, the display 506 includes a flat panel video screen with a touchscreen. In some embodiments the interface 504 includes one or more of stylus, keyboard, and touch pad input. The battery 516, in some embodiments, includes at least one of a replaceable battery or a rechargeable battery, such as a lithium ion battery. The power input 518, in some embodiments, is used to provide at least one of AC and DC power to the collection device 500, such as for the purposes of at least one of recharging the battery 516 and providing operational power to the collection device 500.

In various embodiments, the sensor inputs 512 include one or more inputs for external sensors that collect vibration data, temperature data, sound data, thermal images, and vapor sensing. In various embodiments, the inputs 512 either receive the raw data from such sensors, such as might be configured in a probe form, or data that has been conditioned by an external device and provided in a data stream to the collection device 500. In some embodiments, some sensors 510, such as those previously described, are built in to the collection device 500.

Some embodiments of the collection device 500 include signal processors 522, such as one or more of analog to digital converters for analog data that might be received from either the sensors 510 or the sensor inputs 512, and dedicated signal conditioning circuits such as filters and domain transformers, amplifiers, and so forth.

In some embodiments, the communication ports 514 include components such as wireless Ethernet (such as defined by the various IEEE 802.11 standards), cellular data transceivers (such as defined by IEEE 802.16, 802.20, and other standards), hardwired network connections such as Ethernet, Bluetooth, and other communication protocols. Some embodiments of the collection device 500 include output ports 520, such as video output, signal output (such as from the sensors 510, sensor inputs 512, or otherwise), USB connection, and otherwise.

In various embodiments the ruggedized housing 524 is formed of at least one of metal and plastic. In some embodiments the housing 524 is vented, and in other embodiments the housing 524 provides substantially hermetic protections to the other components disposed within the housing 524. The housing 524 in some embodiments is to at least some degree dust proof, water proof, and shock proof, and provides some degree of thermal insulation to the collection device 500.

The collection device 500 is small enough to be held in one hand by the technician, and light enough so that the technician is able to carry it on a route that he walks from one piece of machinery to another. The battery 516 is, in some embodiments, sufficient such that the collection device 500 can provide power to the sensors 510, comm ports 514, and other components of the collection device 500 for a length of time that is sufficient for the technician to gather data on his route and at least one of store the data and upload it to a central data repository.

Overview

Adaptive and state driven data collection techniques enable the collection device 500 to adapt how, when, and what data to collect, based on at least one of (a) the state of the machine being monitored, (b) timing information such as a schedule, and (c) external inputs from other devices and systems. This information is provided to the technician, such as by presenting the data collection route and the machines to be read on the display 506. The various embodiments of the present invention enable adaptive and state driven data collection techniques to be used with collection devices 500 as described above, and device communicators, calibrators, inspection cameras, and portable gas finding devices.

The word "adaptive" in this context refers to the ability to adjust to changing situations, automatically in some embodiments. By way of example, adaptive data collection in some embodiments is applied to PdM routes, device inspection routes, walk-around preventive maintenance inspections, thermographic surveys, ultrasonic leak detection, steam trap inspection routes and power line inspection surveys.

The data collection schedule for each machine is generally determined by at least one of (a) the type of machine, (b) the process load, (c) the state of the machine, (d) the condition of the machine, and so forth. This means that the machines on a particular route may have different data collection schedules. The routes or surveys or other inspection information downloaded to the collection device 500, such as through the comm port 514, contains a scheduled time for data collection for each machine, and only those machines due within the given window of time would have data collected at the time the route is walked.

Machine states range from simple conditions such as (a) running versus idle, (b) running speed, (c) current running load, (d) material being processed, (e) machine temperature, (f) machine age, (g) operating environment, and (h) how well or poorly the machine is running, to more complex conditions such as an indication of a possible problem based upon prior readings. In a state such as the latter example, the analyst might schedule additional data collections. The state of the equipment can be used to help determine many aspects of data collection, such as the following items.

How often the data is collected. For example, what is the ideal maximum data collection frequency in the given state?

When the data is collected. For example, if the machine is not under load, then no data should be collected.

What data should be collected? For example, when liquid X is being pumped, collect parameter A; when liquid Y is being pumped, collect parameters A and B.

What data should be stored? For example, only store spectra and waveforms if a parameter is in alarm.

The machine state can also be a factor in regard to the meta-data that is collected. For example, it may be a factor in determining alarm levels, reporting intervals, data collection schedules, and so forth.

In some embodiments, there are at least two times at which the state of the machine is determined and recorded, which times are (a) just prior to data collection, and (b) just after data collection. Thus, while not required, it is desirable to determine and reassess the state of the machine each time the data is collected and analyzed.

The methods described herein can be applied to a particular machine, group of similar machines, or machine on a particular route. As used herein the word "machine" also refers to equipment and other devices that are amenable to the methods described herein. No specific order of the steps as described below is intended, except where one step of a necessity requires the input of results from a previous step.

Setup

In one embodiment, the first step in the setup process is to identify just what the states are for a given machine. For example, the different states for a machine can be defined as different sets of machine conditions, in which the data collected from the machine differs, based on the state of the machine.

In some embodiments, the second step is to identify the variables (and their values) that indicate the state of the machine. These variables can be determined, for example, by the data collection device 500 itself, entered by the technician, or received from a remote location over a network.

The third step in some embodiments is to determine what data should be collected for each of the various machine states.

The fourth step is to store the setup information defined in the steps above. In some embodiments, this setup information is stored in a memory, either after all the steps are completed, or after each step. The memory could be, for example, located in a remote computer, the memory 508 in the collection device 500, or some combination of the two.

Data Collection

The fifth step of the overall process is to bring the setup information into the collection device 500. After the setup information is loaded into the collection device 500, it is ready to collect data, which is the sixth step of the process. As a part of this process, the state of the machine is ascertained.

In some embodiments, the collection device 500 includes the circuitry that is needed to read the variables identified in the second step of the setup process, and actually determine the state of the machine. These variables can be read through the inputs 512, by use of the on-board sensors 510, or accessed from a remote source via the comm port 514, for example. However, in some embodiments, the user determines the state of the machine, and enters it into the collection device 500.

Based on the current state of the machine, the collection device 500 is configured to read the appropriate predefined set of data, as determined from the setup procedure. If for some reason the current state of the machine cannot be determined, then in some embodiments a predetermined default set of PdM data is read by the collection device 500.

Once the data is read, step seven is to analyze the data. This is accomplished by the collection device 500 in some embodiments, and in other embodiments is accomplished by sending the data to an external processor and analyzing the data there. Other embodiments use some combination of the two. The analysis of the data may trigger one or more of the alerts that were defined during the setup process, based on the collected data and the machine state. The analysis of the data is, in some embodiments, performed automatically, immediately upon collection, and without any intervention by the technician.

In some embodiments, the analysis of the data as correlated with the machine state indicates that additional data should be collected, which is step 8. If so, then the additional data is also read by the collection device 500 (step 6) and analyzed (step 7). This is done until there is no more data to be collected.

In some embodiments, step nine is to deliver the collected data from the collection device 500 to a remote computing system that is designed for long-term trending and analysis of machine health. This remote system retains, in some embodiments, the state information under which the data was collected from the machine, so that the historical data can be correlated to the machine state in which it was collected.

The analysis of the collected data and machine state might indicate that an adjustment to the data collection schedule for the machine might be appropriate, which is step ten. For example, the analysis might indicate that the data can safely be collected less frequently. Alternately, the analysis might indicate that the data for the machine should be collected more often than the previous schedule indicated. The analysis in some embodiments is performed in at least one of the collection device 500 and a remote computing device.

Step eleven is to synchronize any modified data collection routine back to the collection device 500. In some embodiments, the analysis and machine state might indicate that more data should be collected, either right then, at some given point in the future, or according to a determined schedule.

Exemplary Embodiment

With reference now to FIGS. 1-4, there is provided an exemplary embodiment of the methods described above, and implemented in the collection device 500 of FIG. 5. It is appreciated that not all embodiments of the present invention are limited to the scope or order of the steps of the depicted embodiment.

Figure 1:
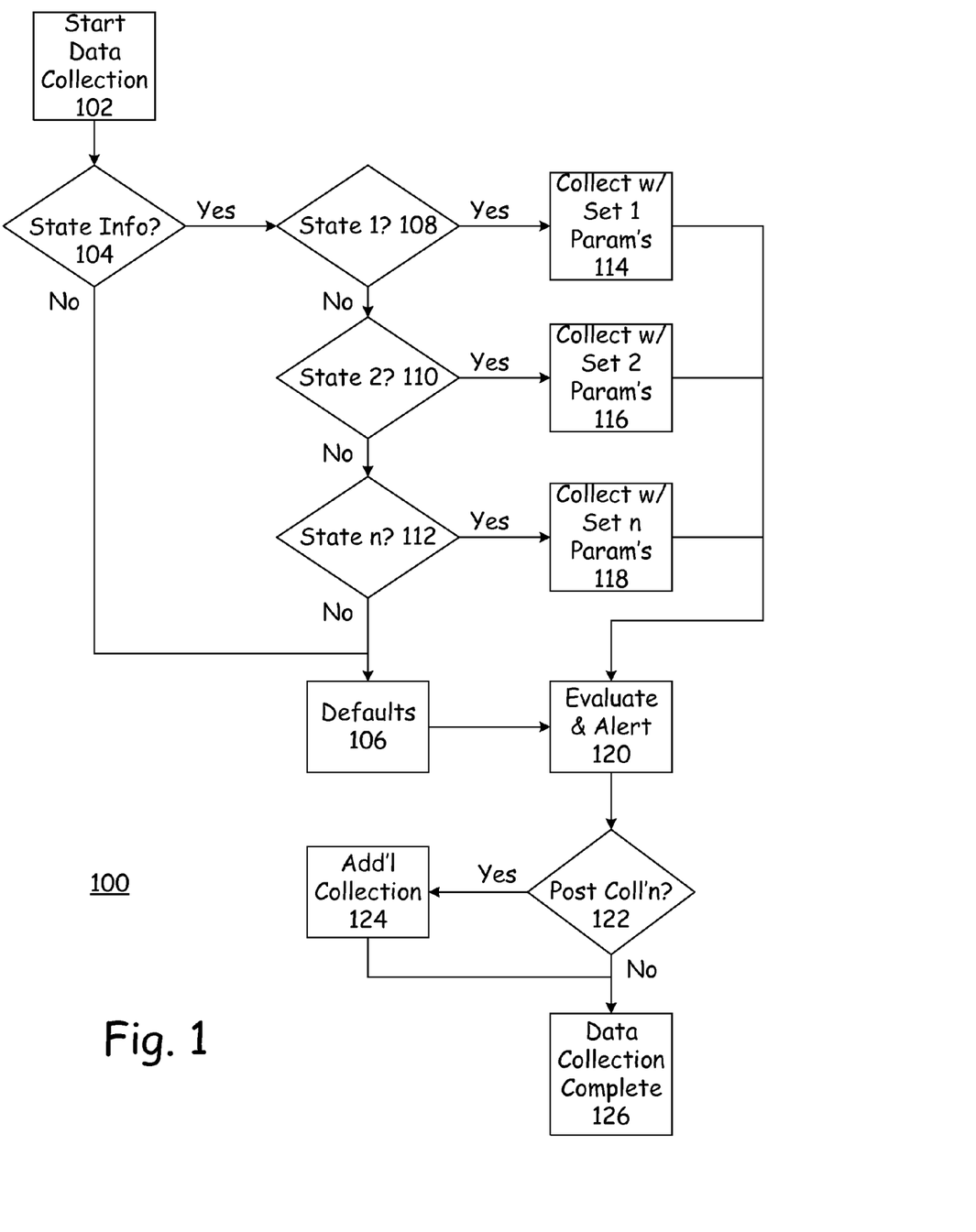
FIG. 1 is a flow chart for a method for determining data collection parameters according to an embodiment of the present invention.

In FIG. 1 there is depicted a data collection routine 100, which starts in block 102. A determination is made as to whether state information is available for a given machine, as given in block 104. If no state information is available for the machine, then the collection device 500 is programmed to collect a default set of data from the machine, as given in block 106. However, if state information is available, then the collection device 500 attempts to determine which state the machine is in, as given in blocks 108, 110, and 112. If a predetermined state of the machine is determined, then the collection device 500 collects the predetermined set of data that is associated with that machine state, as given in blocks 114, 116, and 118. If, however, the state cannot be determined from the data and inputs by which machine states are determined, then once again the default data is collected, as given in block 106.

Once the collection device 500 has collected the desired predetermined data set, be it state specific or default, the data is analyzed as given in block 120. As described above, the analysis can be performed either in the collection device 500 or transmitted to a remote computing device for analysis there, with the results then transmitted back to the collection device 500. In either embodiment, the analysis can occur automatically, without any input from the technician. As a part of the analysis, the data is compared against threshold limits, and any violation of the limits produces at least one of alert conditions and adjustment to the collection interval.

Some alert conditions trigger the collection of additional data from the machine, as given in block 122. If so, the technician is notified by the collection device 500 if any action on his part is required. In some embodiments, the additional action that the technician might be prompted to take includes actions such as one or more of bump testing the machine, moving the sensors, returning at a later point in time for additional readings, and making a change to the operation of the machine.

In some embodiments, if no technician intervention is required, the collection device 500 automatically proceeds with the additional data collection without further input from the technician, as given in block 124. When all desired data has been collected, as predetermined by the engineer during setup, then the data collection routine for that machine is complete, as given in block 126.

Figure 2:
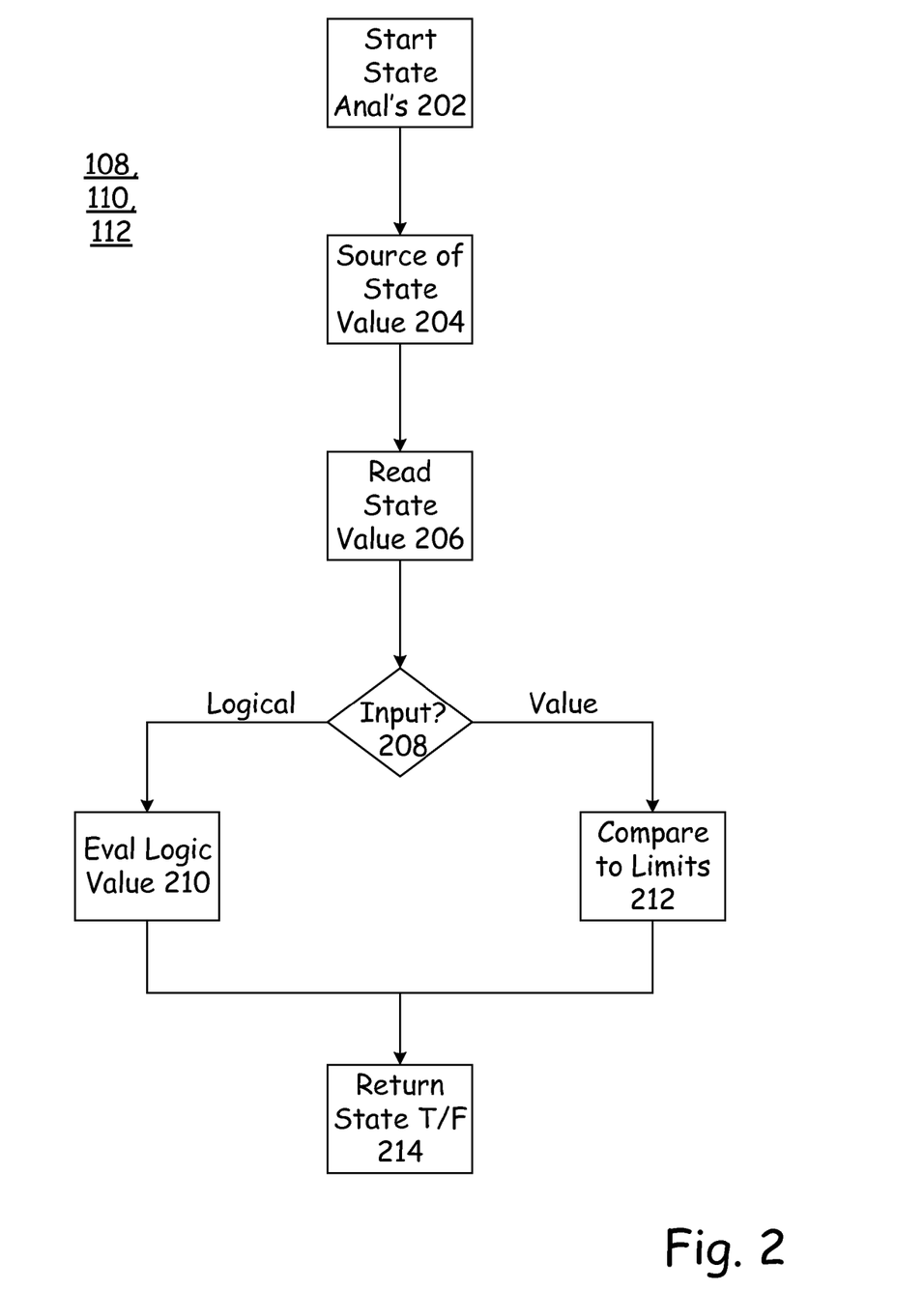
FIG. 2 is a flow chart for a method for determining the state of a machine according to an embodiment of the present invention.

FIG. 2 provides more detail in regard to one embodiment of steps 108, 110, and 112 of FIG. 1, wherein the state of the machine is determined. The process of analyzing the state of the machine begins in block 202. As described above, one or more variables are used to determine the state of the machine. These variables are defined during the setup process, such as by an engineer. The source of the variables can be different for different machines, and even a given machine may use variables from different sources that are used as input to determine the state of the machine.

The sources for these variables can include, for example, direct measurement by a sensor 510 on the collection device 500, input from a sensor plugged into an input port 512, information received on a comm port 514, input from the technician on the interface 504, or an alert that was previously generated. These sources are all determined from the setup data as given in block 204.

As indicated in block 206, the various state variables are then read, according to the methods indicated in block 204. As a part of this, the collection device 500 can automatically read some of the desired data, or download it from another source, or instruct the technician to take specific action to read the data or input the data.

Either after all of the state data has been captured, or after each piece of state data is captured, or some combination of the two, the state data is evaluated, as commenced in block 208. If the piece of state data is a logical value, then the logical value is assessed as given in block 210. If the piece of stat data is a value, then it is compared to the limits determined by the engineer during the setup process. When this has been done for all of the state data that has been gathered, it is determined whether the state data indicates a given state, as indicated in block 214.

In one embodiment, this is done by loading in the predefined conditions that indicate a given state, comparing the gathered variables to that set of predefined conditions, and outputting a flag indicating whether the candidate state matches the variables. If so, then the condition is true that the given state has been matched. If not, then a comparison to the set of predefined conditions for another state is compared to the gathered variables, and so on until the matching state is found. If no matching state is found, then a default set of data is gathered by the collection device 500, instead of a state specific set of data.

Figure 3:
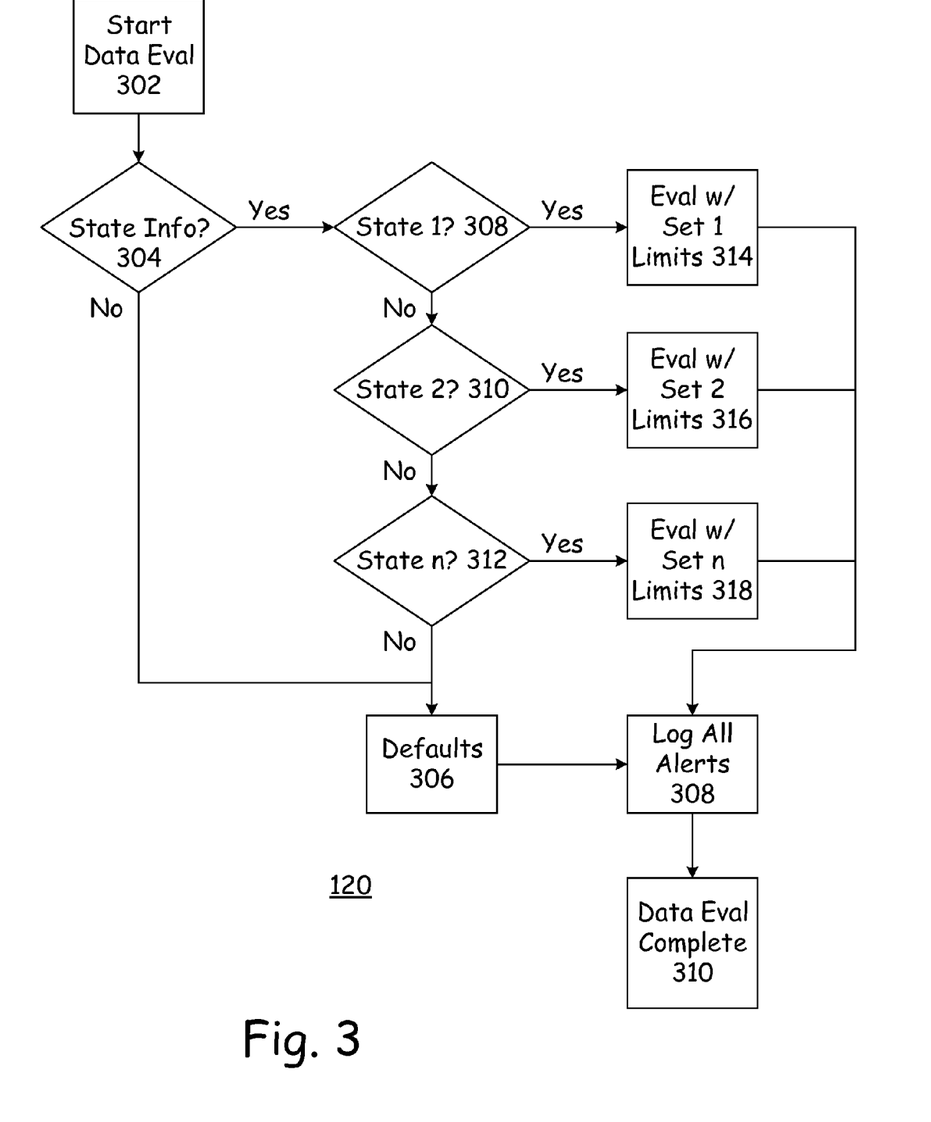
FIG. 3 is a flow chart for a method for setting alarm levels based on the state of the machine according to an embodiment of the present invention.

With reference now to FIG. 3, there is depicted an embodiment for the method by which the collection device 500 performs the data analysis 120 of FIG. 1, which starts in block 302. As an initial matter, a determination is made as to whether state information is available for a given machine, as given in block 304, similar to that as described above in regard to FIG. 1, wherein the data collection settings were loaded. In some embodiments, the state information for the machine as determined in process 100 from FIG. 1 is retained, and does not need to be repeated. However, in some embodiments the process by which the machine state is determined by the collection device 500 is repeated, as given below. In some embodiments the method as depicted in FIG. 2 is used to determine the state of the machine.

If no state information is available for the machine, then the collection device 500 is programmed to use a default set of data analyses, as given in block 306. However, if state information is available, then the collection device 500 attempts to determine which state the machine is in, as given in blocks 308, 310, and 312. If a predetermined state of the machine is determined, then the collection device 500 analyzes the data using a predetermined set of limits and routines that is associated with that machine state, as given in blocks 314, 316, and 318. If, however, the state cannot be determined from the data and inputs by which machine states are determined, then once again the default analysis of the data is used, as given in block 306.

As described above, any violation of the limits produces alert conditions, which are logged as given in block 308. The method then concludes as given in block 310.

Figure 4:
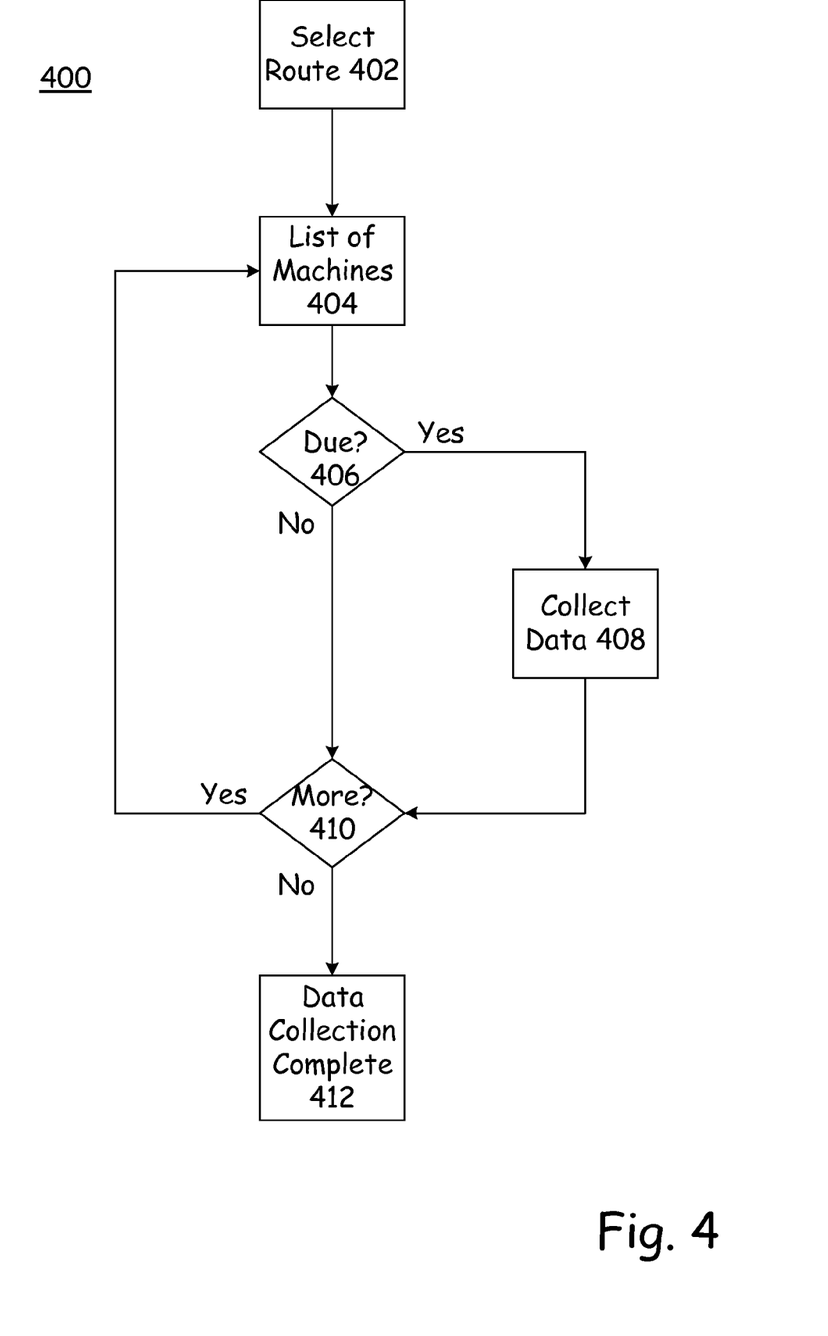
FIG. 4 is a flow chart for a method for adapting a data collection route according to an embodiment of the present invention.

FIG. 4 depicts an embodiment of a method 400 wherein the route presented by the collection device 500 to the technician is adapted based on the states of the machines along the route. The method commences at block 402, where the technician selects a desired route for data collection and analysis, such as by making a selection from a list of such routes that are presented on the display 506 of the collection device 500, using the human interface 504. Associated with the selected route is a list of machines that have previously been identified, such as by the engineer, as belonging to the selected route, as given in block 404.

The collection device 500, in some embodiments, interrogates various data sources, such as data logs on remote computing or storage devices, to determine whether data should be gathered from each of the machines on the route. In some embodiments, a live determination of the state of the machine is made, and a decision is made by the collection device 500 as to whether it is appropriate to collect data from the machine, based at least in part upon the state of the machine. In some embodiments the collection device 500 merely looks at a recorded schedule of data collection for the machine, compares it to a log of when the data was last gathered, and decides whether to include the machine on the route or not.

In some embodiments the decision as to whether to gather data from a given machine is made at the time that the technician is at the machine. In other embodiments the machine is included or excluded from the route at the onset of the route development, before the technician starts walking the route. In some embodiments, a combination of these two methods is employed, with some machine included or excluded at the onset of the route selections, and other machines included or excluded based on the state of the machine, for example, at the time when the technician is about to collect data from the machine.

In any case, if the machine is due for data collection, as given in block 406, then data is collected, as given in block 408, which step correlates to method 100 of FIG. 1. A determination is made as to whether more machines are to be collected on the route, as given in block 410. If so, then the method returns to block 404, and if not, the route and data collection are completed, as given in block 412.

Use Cases

Additional Data Collection Based on Collected Data

In this case, the engineer who defines the data collection route wants to keep the amount of data collected, and the associated data collection time, to a minimum for properly running machines. However, if the standard data and machine state indicate a possible issue with the machine and an alert is trigger (which alert condition is defined during the setup process), then the engineer would like to have additional data collected before the technician collecting the data leaves the site. In this case the engineer predefines during the setup process an additional set of data collection parameters for data to be collected if alerts occur on the standard data. The data collector device 500 acquires the additional data without intervention by the technician at the site or the engineer who defined the route.

Examples

If taking readings on an induction motor, and the analysis parameter that contains the peak for AC current (i.e. 120 Hz) triggers an alert, then launch a higher resolution spectrum to differentiate between 2×RPM and 2×line frequency.

If a measurement triggers any type of high frequency alert, then extend the frequency at which measurements are taken, and recollect the data so that the analyst has the actual frequency characteristics of the signal in the high frequency domain.

If the initial reading shows a significant portion of the vibration energy is sub-synchronous, then launch an SST measurement to get more accurate values for the lower portion of the spectrum.

Benefits

Saves time: Because the additional data is collected while the technician is already at the machine site, there is no need to return to the machine later to collect the additional data.

Preserves measurement location: some readings may only be taken at a specific location. If the first measurement was detected at location A, and the technician returned later to collect additional diagnostic data at location B (which might be very close to location A), the defect patterns might not be visible in the newly-read vibration signal.

Captures transient events: some machine defects are induced by a specific configuration of the manufacturing process. An initial reading collected during process configuration A may show clear signs of a mechanical defect such as resonance. If the technician returned at a later time to collect additional diagnostic data, the machine might then be running in a different state, where the defect is no longer visible.

Intermittent operation: many machines operate only intermittently as required by the production process. An initial reading on a machine while running could prompt the person to return at a later date to collect additional diagnostic data, but the machine is no longer in operation; therefore, there is no opportunity to collect any additional data.

Additional Measurements Required

In this case, the engineer who defines the route wants to collect additional information on the machine if certain conditions are true, which requires additional action by the technician at the machine site. In this case, once the current state of the machine is evaluated, or initial data is collected and evaluated, it is determined that the technician should change the customary procedure and collect additional data. This additional data could be at a different measurement location or it could require technician participation, such as a bump test. Once the collection device 500 determines that an additional data collection is required, the technician is prompted to take specific action to collect that data.

Examples

If the initial reading shows that a significant portion of the vibration energy is non-synchronous, then prompt the technician to connect a tachometer, launch a speed detection algorithm, and then re-evaluate the reading with the improved speed measurement, or recollect the reading using the new speed measurement as a basis for the reading.

If collected data indicates a possible resonance, prompt the technician to bump test the machine a certain number of times, and then press enter to subtract the running speed vibration out of the readings.

Benefits

Saves time: Because the additional data is collected while the technician is already at the machine site, there is no need to return to the site later to collect the additional data.

Captures transient events: some machine defects are induced by a specific configuration of the manufacturing process. An initial reading collected during process configuration A may show clear signs of a mechanical defect, such as resonance. If the person returned at a later time to collect additional diagnostic data, the machine might then be running in a different state where the defect is no longer visible.

Intermittent operation: many machines operate only intermittently as required by the production process. An initial reading on a machine while running could prompt the technician to return at a later date to collect additional diagnostic data, but the machine is no longer in operation; therefore, there is no opportunity to collect any additional data.

Pumping Multiple Materials

In this case, the customer has a variable speed motor-pump that pumps materials of different viscosity or different aggregate content at different times. These different predetermined states are associated with different predetermined data collection requirements and different predetermined alert levels. The engineer sets up the state driven route with different collection parameters defined for each state of the machine, and creates appropriate alert references. At the time of data collection, the current state of the machine is determined either automatically through communication with the machine control system, or through the personal observation and manual entry of the technician. The collection device 500 loads in the predetermined set of collection parameters that are appropriate for the current state of the machine, and the data is evaluated with the appropriate alert references.

Adaptive Routes

In this case, the technician has a route that he walks to collect data on a set of machines. These machines each have their own predetermined data collection schedule, which is set up in the collection device 500. Instead of creating multiple routes for the various data collection schedules, a single route is created, which dynamically adapts to the schedule for each machine. This simplifies the maintenance of the routes.

The various embodiments described herein may be executed, in part or in whole, by one or more of the manufacturer of the handheld PdM device that embodies the invention, by a service organization, or by the end user of the device.

Embodiments may be accomplished within the collection device 500, or with the aid of a secondary device such as a personal computer. For example, steps 7 and 8 could be completed wholly by the collection device 500, or by uploading the data, such as through a wireless network, from step 6 to a remote computer, automatically analyzing the data on the remote computer (step 7), determining if additional data needs to be collected on the remote computer (step 8) and then, if necessary, downloading additional instructions to the collection device 500.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of automatically adjusting data collection parameters for machines on a data collection route in a portable collection device used by a technician based on states of the machines, the method comprising the steps of:
   for each machine on the data collection route,
   reading the state of the machine into the portable collection device, wherein the step of reading the state of the machine into the portable collection device comprises at least one of, directly measuring with the portable collection device machine parameters that are indicative of the state of the machine, the technician manually entering into the portable collection device machine parameters that are indicative of the state of the machine, and automatically downloading from a remote device into the portable collection device machine parameters that are indicative of the state of the machine, automatically including the machine in or excluding the machine from the data collection route based at least in part on the state of the machine, automatically configuring the portable collection device with a first predetermined set of data collection parameters that is automatically configured based at least in part on the state of the included machine, collecting an initial set of data from the included machine with the portable collection device based on the first predetermined set of data collection parameters, automatically analyzing the initial set of data using a predetermined set of data analysis parameters that is automatically configured based at least in part on the state of the included machine, to determine alerts, based on the alerts, selectively automatically immediately collecting a second set of data from the included machine based on a second predetermined set of data collection parameters that is automatically configured based at least in part on the state of the included machine and the alerts, and based on the alerts, selectively prompting the technician with the portable collection device to take a predetermined action and collect a third set of data from the included machine, where the action and the third set of data is based on a third predetermined set of data collection parameters that is automatically configured at least in part on the state of the included machine and the alerts.

2. The method of claim 1, wherein the state of the machine includes at least one of running, idle, length of run time, length of idle time, run speed, machine age, machine type, and material processed by the machine.

3. The method of claim 1, wherein the sets of data collection parameters are disposed in at least one of:
  a memory on the portable data collection device, and
  a remote computing system and accessed by the portable data collection device over a data network.

4. The method of claim 1, wherein the sets of data include at least one of vibration, temperature, thermal image, sound, oil sample, and technician assessment.

5. The method of claim 1, wherein the predetermined action for the technician to take includes at least one of bump testing the included machine, moving sensors, and returning at a later time to take readings, as directed by the portable data collection device.

6. A method of automatically adjusting data collection parameters for machines on a data collection route in a portable collection device used by a technician based on states of the machines, the method comprising the steps of:
  for each machine on the data collection route,
    reading the state of the machine into the portable collection device, wherein the step of reading the state of the machine into the portable collection device comprises at least one of,
      directly measuring with the portable collection device machine parameters that are indicative of the state of the machine,
      the technician manually entering into the portable collection device machine parameters that are indicative of the state of the machine, and
      automatically downloading from a remote device into the portable collection device machine parameters that are indicative of the state of the machine,
    automatically configuring the portable collection device with a first predetermined set of data collection parameters that is automatically configured based at least in part on the state of the included machine,
    collecting an initial set of data from the included machine with the portable collection device based on the first predetermined set of data collection parameters,
    automatically analyzing the initial set of data using a predetermined set of data analysis parameters that is automatically configured based at least in part on the state of the included machine, to determine alerts, and
    based on the alerts, selectively prompting the technician with the portable collection device to take a predetermined action and collect a third set of data from the included machine, where the action and the third set of data is based on a third predetermined set of data collection parameters that is automatically configured at least in part on the state of the included machine and the alerts.

7. The method of claim 6, wherein the state of the machine includes at least one of running, idle, length of run time, length of idle time, run speed, machine age, machine type, and material processed by the machine.

8. The method of claim 6, wherein the sets of data collection parameters are disposed in at least one of:
  a memory on the portable data collection device, and
  a remote computing system and accessed by the portable data collection device over a data network.

9. The method of claim 6, wherein the sets of data include at least one of vibration, temperature, thermal image, sound, oil sample, and technician assessment.

10. The method of claim 6, wherein the predetermined action for the technician to take includes at least one of bump testing the included machine, moving sensors, and returning at a later time to take readings, as directed by the portable data collection device.

11. A method of automatically adjusting data collection parameters for machines on a data collection route in a portable collection device used by a technician based on states of the machines, the method comprising the steps of:
  for each machine on the data collection route,
    reading the state of the machine into the portable collection device, wherein the step of reading the state of the machine into the portable collection device comprises at least one of,
      directly measuring with the portable collection device machine parameters that are indicative of the state of the machine,
      the technician manually entering into the portable collection device machine parameters that are indicative of the state of the machine, and automatically downloading from a remote device into the portable collection device machine parameters that are indicative of the state of the machine, automatically configuring the portable collection device with a first predetermined set of data collection parameters that is automatically configured based at least in part on the state of the included machine, collecting an initial set of data from the included machine with the portable collection device based on the first predetermined set of data collection parameters, and automatically analyzing the initial set of data using a predetermined set of data analysis parameters that is automatically configured based at least in part on the state of the included machine.

12. The method of claim 11, wherein the state of the machine includes at least one of running, idle, length of run time, length of idle time, run speed, machine age, machine type, and material processed by the machine.

13. The method of claim 11, wherein the set of data collection parameters is disposed in at least one of:
a memory on the portable data collection device, and
a remote computing system and accessed by the portable data collection device over a data network.

14. The method of claim 11, wherein the set of data includes at least one of vibration, temperature, thermal image, sound, oil sample, and technician assessment.

15. A method of automatically adjusting data collection parameters for machines on a data collection route in a portable collection device used by a technician based on states of the machines, the method comprising the steps of:

for each machine on the data collection route,
reading the state of the machine into the portable collection device, wherein the step of reading the state of the machine into the portable collection device comprises at least one of,
directly measuring with the portable collection device machine parameters that are indicative of the state of the machine,
the technician manually entering into the portable collection device machine parameters that are indicative of the state of the machine, and
automatically downloading from a remote device into the portable collection device machine parameters that are indicative of the state of the machine,
automatically configuring the portable collection device with a first predetermined set of data collection parameters that is automatically configured based at least in part on the state of the included machine,
collecting an initial set of data from the included machine with the portable collection device based on the first predetermined set of data collection parameters, automatically analyzing the initial set of data using a predetermined set of data analysis parameters that is automatically configured based at least in part on the state of the included machine, to determine alerts, and based on the alerts, selectively automatically immediately collecting a second set of data from the included machine based on a second predetermined set of data collection parameters that is automatically configured based at least in part on the state of the included machine and the alerts.

16. The method of claim 15, wherein the state of the machine includes at least one of running, idle, length of run time, length of idle time, run speed, machine age, machine type, and material processed by the machine.

17. The method of claim 15, wherein the sets of data collection parameters are disposed in at least one of:
a memory on the portable data collection device, and
a remote computing system and accessed by the portable data collection device over a data network.

18. The method of claim 15, wherein the sets of data include at least one of vibration, temperature, thermal image, sound, oil sample, and technician assessment.

19. A method of automatically adjusting data collection parameters for machines on a data collection route in a portable collection device used by a technician based on states of the machines, the method comprising the steps of:

for each machine on the data collection route,
reading the state of the machine into the portable collection device, wherein the step of reading the state of the machine into the portable collection device comprises at least one of,
directly measuring with the portable collection device machine parameters that are indicative of the state of the machine,
the technician manually entering into the portable collection device machine parameters that are indicative of the state of the machine, and
automatically downloading from a remote device into the portable collection device machine parameters that are indicative of the state of the machine, and
automatically including the machine in or excluding the machine from the data collection route based at least in part on the state of the machine.

20. The method of claim 19, wherein one of the data collection parameters that is adjusted is a scheduling interval for the machine.

21. The method of claim 19, further comprising during execution of the data collection route, automatically including in the data collection route a machine that had previously been excluded from the data collection, based at least in part on a change of the state of the machine.

22. The method of claim 19, wherein the state of the machine includes at least one of running, idle, length of run time, length of idle time, run speed, machine age, machine type, and material processed by the machine.

* * * * *